United States Patent [19]

Raines

[11] 4,169,795
[45] Oct. 2, 1979

[54] LOW PROFILE FILTER

[75] Inventor: Kenneth Raines, Bethlehem, Pa.

[73] Assignee: National Patent Development Corporation, New York, N.Y.

[21] Appl. No.: 824,236

[22] Filed: Aug. 12, 1977

[51] Int. Cl.² ............................................. C02C 1/14
[52] U.S. Cl. .................................... 210/446; 210/453
[58] Field of Search ............... 210/435, 445, 446, 459, 210/460, 483, 453

[56] References Cited

U.S. PATENT DOCUMENTS

| | | | |
|---|---|---|---|
| 1,835,429 | 12/1931 | Rice et al. | 210/445 |
| 2,019,094 | 10/1935 | Rice et al. | 210/445 |
| 2,068,858 | 1/1937 | Jones | 210/445 |
| 2,370,668 | 3/1945 | Johnson | 210/445 |
| 3,225,931 | 12/1965 | Schaab | 210/460 |
| 3,932,153 | 1/1976 | Byrns | 210/445 |
| 3,992,886 | 11/1976 | Scott | 210/445 |
| 4,021,353 | 5/1977 | Raines et al. | 210/446 |
| 4,052,315 | 10/1977 | Lindsay, Jr. et al. | 210/445 |
| 4,062,781 | 12/1977 | Strauss et al. | 210/446 |
| 4,113,627 | 9/1978 | Leason | 210/446 |

*Primary Examiner*—Theodore A. Granger
*Attorney, Agent, or Firm*—Shoemaker and Mattare, Ltd.

[57] ABSTRACT

A low profile filter assembly for use in IV sets and the like includes a pair of spaced apart, axially aligned inlet and outlet filter adaptors secured to inlet and outlet ends, respectively, of a filter tube. A generally conically shaped filter member is connected at its opposite ends to the inlet and outlet filter adaptors and extends longitudinally within the filter tube between the adaptors. Lengths of flexible IV tubing are connected with the adaptors for conveying fluid to and from the filter assembly. The filter cone is disposed with its larger end connected to the inlet adaptor and its smaller end connected to the outlet adaptor and the filter assembly diameter is only about twice the diameter of the tubing connected therewith, yet a filter area many times greater than the cross-sectional area of the tubing is obtained. Additionally, the filter is simple and economical to assemble.

5 Claims, 7 Drawing Figures

LOW PROFILE FILTER

BACKGROUND OF THE INVENTION

This invention relates generally to filters for IV sets and the like for intravenous administration of fluids. More particularly, the present invention relates to an inline filter assembly in which a submicron filter element is utilized to filter contaminants from material flowing through the IV set. Such filters require increased surface area in order to function with standard gravity IV sets. Large filters, however, are bulky and difficult to place near the site of injection. Moreover, in prior art filters for IV sets and the like which utilize submicron filter elements, air entrapment is a problem. Additionally, construction and assembly of prior art filters for use in IV sets is expensive and difficult to accomplish with any significant degree of reliability.

With the present invention a low profile inline filter assembly is provided for use in an IV set, and is very small in cross-sectional dimension in comparison with prior art inline filter assemblies, and which is, therefore, particularly suitable for placement near the final section of IV tubing, or, in other words, near the site of injection. Further, the present invention enables a much larger filter area to be used in a given cross-sectional area than can be used in prior art devices. The result is a very compact filter which at the same time results in an increased flow rate over prior art filters of comparable size. Additionally, air entrapment is not a problem with the filter of the present invention, since incoming fluid pushes or channels the air ahead of it, pushing the air through the filter and into the housing or case where it may be easily dispersed by tapping or shaking the housing. Moreover, the filter assembly according to the present invention is simple and economical in construction and is easy to assemble, and a very low reject rate results. Still further, the exceptionally low profile provided by the filter assembly of the invention facilitates handling of the assembly and taping of the filter and attached tubing to the patient.

OBJECTS OF THE INVENTION

Accordingly, it is an object of this invention to provide a low profile inline filter assembly for use in IV sets and the like wherein the filter assembly is easy and economical to assemble and wherein a filtration area many times as great as the cross-sectional area of the IV tubing is obtained.

Another object of the invention is to provide an inline submicron filter assembly for IV sets wherein the filter assembly has a cross-sectional dimension only approximately twice as great as the cross-sectional dimension of the IV tubing.

A still further object of the invention is to provide a method of assembling a submicron inline filter for IV sets wherein a preconstructed filter member is connected to a pair of filter adaptors and the adaptors are secured at the opposite ends of a tubular housing within which the filter member is confined. The adaptors are then attached to lengths of IV tubing to provide the inline filter assembly.

DETAILED DESCRIPTION OF THE INVENTION

Figure 1:
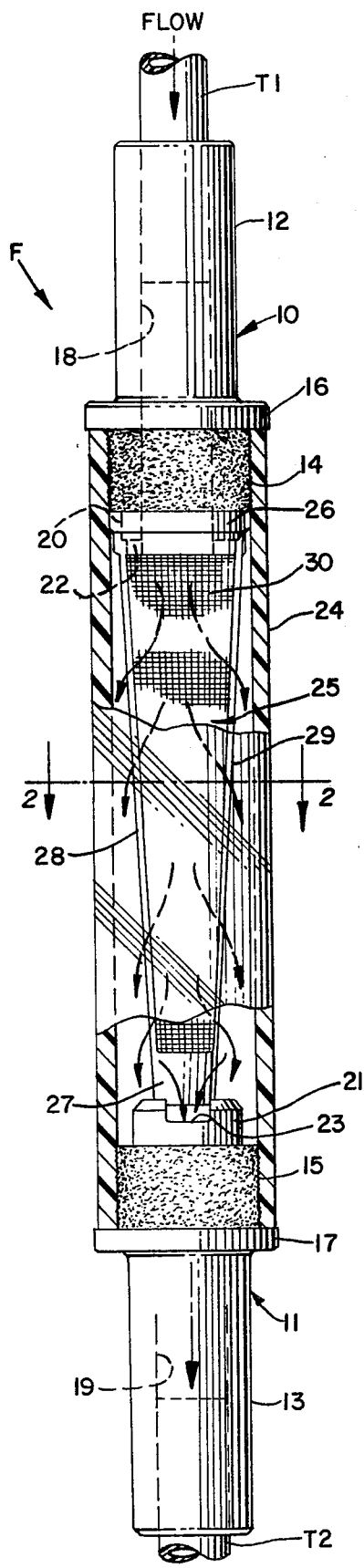
FIG. 1 is a greatly enlarged view in elevation with parts shown in section of a filter assembly according to the invention.

In the drawings, wherein like reference numerals indicate like parts throughout the several views, a filter assembly in accordance with the invention is indicated generally at F and comprises a pair of substantially identical, spaced apart, axially aligned inlet and outlet filter adaptors 10 and 11, respectively, and each comprising an elongate cylindrical outer end 12 and 13, respectively, and a shorter, but somewhat larger in diameter, cylindrical inner end 14 and 15, respectively. A radially outwardly projecting flange or collar 16 and 17 is formed on the adaptors between the ends thereof and the adaptors have tubular bores 18 and 19 extending axially therethrough. Further, the adaptors have relatively short axially projecting bosses or extensions 20 and 21 on the inner ends thereof with diametrically opposed slots or notches 22 and 23 therein. Lengths of IV tubing $T_1$ and $T_2$ are adhesively secured in the bores 18 and 19, respectively, for conveying fluid to and from the filter assembly.

An open ended filter tube or housing 24 is adhesively secured at its opposite ends on the cylindrical inner end portions 14 and 15 of the filter adaptors 10 and 11. The filter tube or housing 24 may be either transparent or opaque, as desired.

Figure 2:
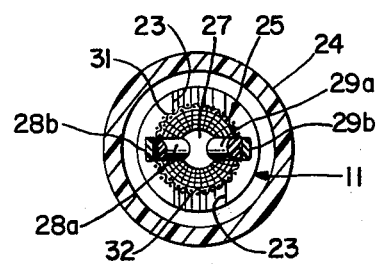
FIG. 2 is a transverse sectional view taken along line 2—2 in FIG. 1.
Figure 3:
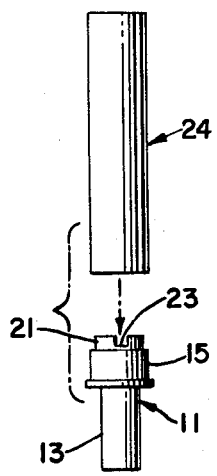
FIG. 3 is an exploded view of one of the filter adaptors of the invention and the tubular housing or filter tube, and this figure illustrates a first step in the method of assembly of the filter.
Figure 4:
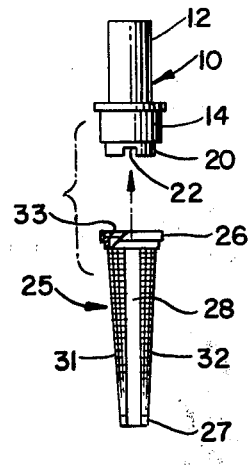
FIG. 4 is an exploded view in elevation of another of the filter adaptors of the invention and the preconstructed filter member about to be assembled thereto.
Figure 5:
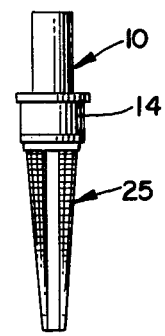
FIG. 5 is a view of the adaptor and filter member of FIG. 4 shown in assembled relationship.
Figure 6:
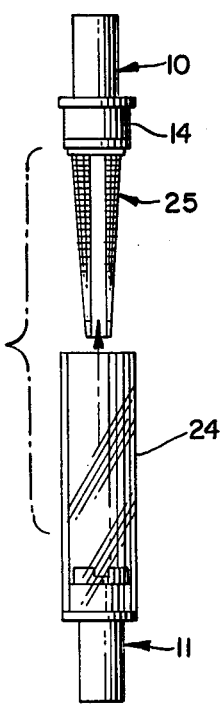
FIG. 6 is an exploded view showing the adaptor and filter member of FIG. 5 being assembled to the adaptor and filter tube of FIG. 3.
Figure 7:
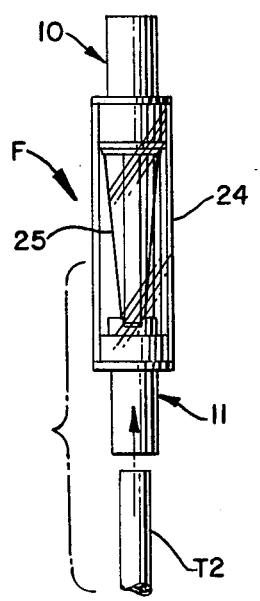
FIG. 7 is a view of a final step in the assembly of the filter showing a length of IV tubing being connected to the assembly of FIG. 6.

A preconstructed, submicron, conically shaped filter member or cone 25 is connected at its opposite ends to the inner end portions of the filter adaptors and is confined within the filter tube or housing 24. The filter cone 25 comprises a large inlet end defined by a circular ring or collar 26 and a small outlet end defined by a closed cap member or wall 27. A pair of interconnecting ribs 28 and 29 are formed integrally with the inlet and outlet ends of the filter member 25 and extend between the inlet and outlet ends 26 and 27 at diametrically opposite sides thereof. A conically shaped submicron filter membrane 30 is bonded to the supporting framework comprising inlet and outlet ends 26 and 27 and side ribs 28 and 29 and defines two diametrically opposite, outwardly rounded, elongate filter surfaces 31 and 32. As seen in FIG. 2, the ribs 28 and 29 comprise inner portions 28a and 29a, respectively, and outer portions 28b and 29b, respectively, with the filter media 30 sandwiched therebetween. The large inlet end 26 has a generally cylindrically shaped internal wall 33 therein which is press fitted over the extension 20 on the inner end of inlet filter adaptor 10. In this connection, it should be noted that the slots 22 in the extension 20 accommodate the ribs 28a and 29a on the inner surface of the filter member 25 when the parts are assembled, as seen in FIG. 5. Moreover, the smaller diameter outlet end 27 of the filter member is engaged within the extension 21 on outlet filter adaptor 11 and the relative position of the filter member and adaptor 11 is such that the filter surfaces 31 and 32 are aligned with the slots 23 in the extension 21 of the outlet adaptor 11.

In assembling the filter of the present invention, one end of the filter tube or housing 24 is dipped in a suitable cement such as VC-1 and the outlet filter adaptor 11 is inserted thereinto and the cement is permitted to dry. The filter cone 25 is assembled to the inlet filter adaptor 10 by pressing the inlet end 26 onto the short extension 20 with care being taken not to contaminate the filter surface or to squeeze or otherwise cause damage to the filter membrane 30. Suitable cement, such as VC-1, is then applied to the inner end portion 14 of the adaptor 10 and the filter tube or housing 24 is placed over the filter 25 with the open end of the tube or housing 24 engaged on the inner end portion 14 of inlet filter adaptor 10. The cement is permitted to dry and a generous amount of a suitable cement, such as a mix of VC-1 and 105 is placed on the outer end surface of tubing $T_2$ and the tubing is pressed into the outlet filter adaptor 11 until it will not go any further. The assembled filter assembly is then ready for use as desired in an IV set or IV extension set or the like.

In a preferred construction of the invention, the filter adaptors comprise white ABS plastic and the filter tube comprises clear PVC plastic of 90 durometer hardness. The filter member or cone is purchased from Filtek Incorporated and is a 5 micron filter membrane carried by a white nylon 6/6 frame. The filter member presents a filtration surface area of about 0.428 square inches and is approximately 1-1/32 inches long between the inlet and outlet ends thereof. Moreover, the filter tube or housing has an outer diameter of about 0.339 inches and this dimension is only slightly greater than the outside diameter of the IV tubing $T_1$ and $T_2$.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A low profile filter assembly for IV sets, comprises: a tubular, open-ended elongate housing having an inlet end and an outlet end; a pair of substantially identical, axially aligned, tubular inlet and outlet filter adaptors secured in the inlet and outlet ends, respectively, of the housing, said filter adaptors having aligned fluid passage means defined therein; a substantially conically shaped, submicron filter member having an inlet end and an outlet end connected, respectively, to the inlet and outlet filter adaptors, said filter member inlet end being connected to said inlet adaptor to conduct fluid from said inlet adaptor to said filter member, the inlet end being larger than the outlet end; and lengths of flexible tubing connected to the inlet and outlet filter adaptors to convey IV fluid to and from the filter assembly; a cap member closing said filter outlet end thereby forcing the IV fluid to exit from said filter member prior to reaching said filter member outlet end so that IV fluid flows from said filter member into said housing, said filter member being attached to said cap member; a slot shaped opening defined in said outlet filter adaptor providing fluid communication between said housing and said outlet adaptor fluid passage; a plurality of supporting ribs extending longitudinally of said housing and supporting said filter member, each of said ribs including an inner portion and an outer portion, said filter member being sandwiched between said rib inner and outer portions; said ribs each being attached at one end to said inlet filter adaptor and at another end to said bypass flow slot via said end cap; a collar attaching said rib one ends to said inlet filter adaptor; said filter assembly having a maximum transverse dimension only about twice as great as the diameter of the tubing.

2. A filter assembly as in claim 1, wherein the housing, adaptors and tubing are adhesively secured together.

3. A filter assembly as in claim 2, wherein the filter adaptors each have a cylindrical inner end portion projecting axially into a respective end of the housing, said filter member connected at its opposite ends to the inner end portions of the adaptors.

4. A filter assembly as in claim 3, wherein the inlet end of the filter member is cylindrical and is engaged snugly over the inner end of the inlet filter adaptor, whereby fluid flowing through the inlet adaptor flows into and through the filter member and the outlet end of the filter member is engaged with the inner end of the outlet adaptor, whereby the filter member is supported in operative position in the housing by the adaptors.

5. A filter assembly as in claim 4, wherein the outlet end of the filter member is inserted into the inner end of the outlet adaptor, and the inner end of the outlet adaptor has slots therein for flow of filtered fluid from the housing into the outlet adaptor.

* * * * *